June 19, 1956
H. C. WINKEL
2,750,805
BELT ALIGNER
Filed Nov. 2, 1953
2 Sheets-Sheet 1
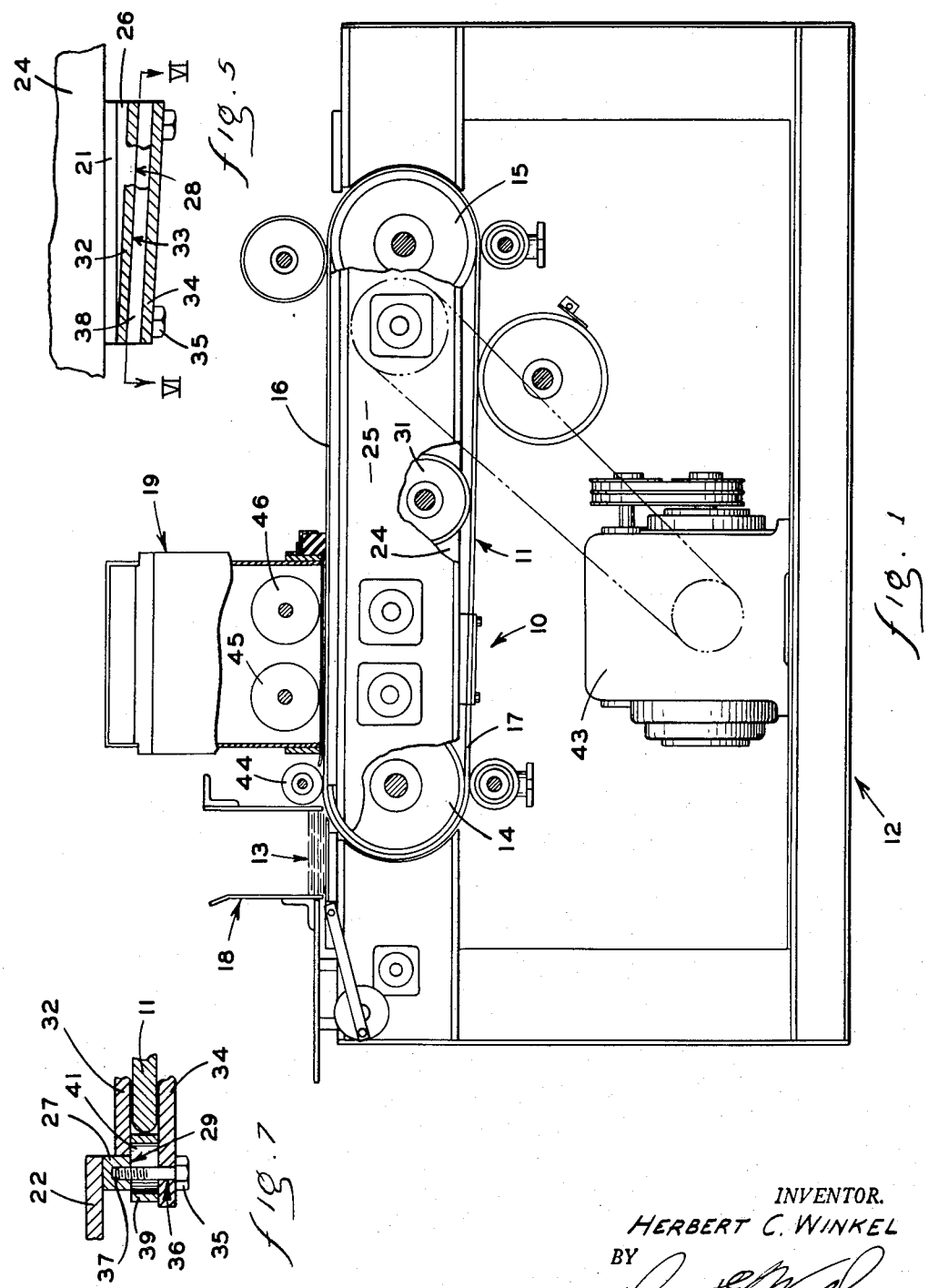
INVENTOR.
HERBERT C. WINKEL
BY
ATTORNEY June 19, 1956    H. C. WINKEL    2,750,805
BELT ALIGNER
Filed Nov. 2, 1953    2 Sheets-Sheet 2
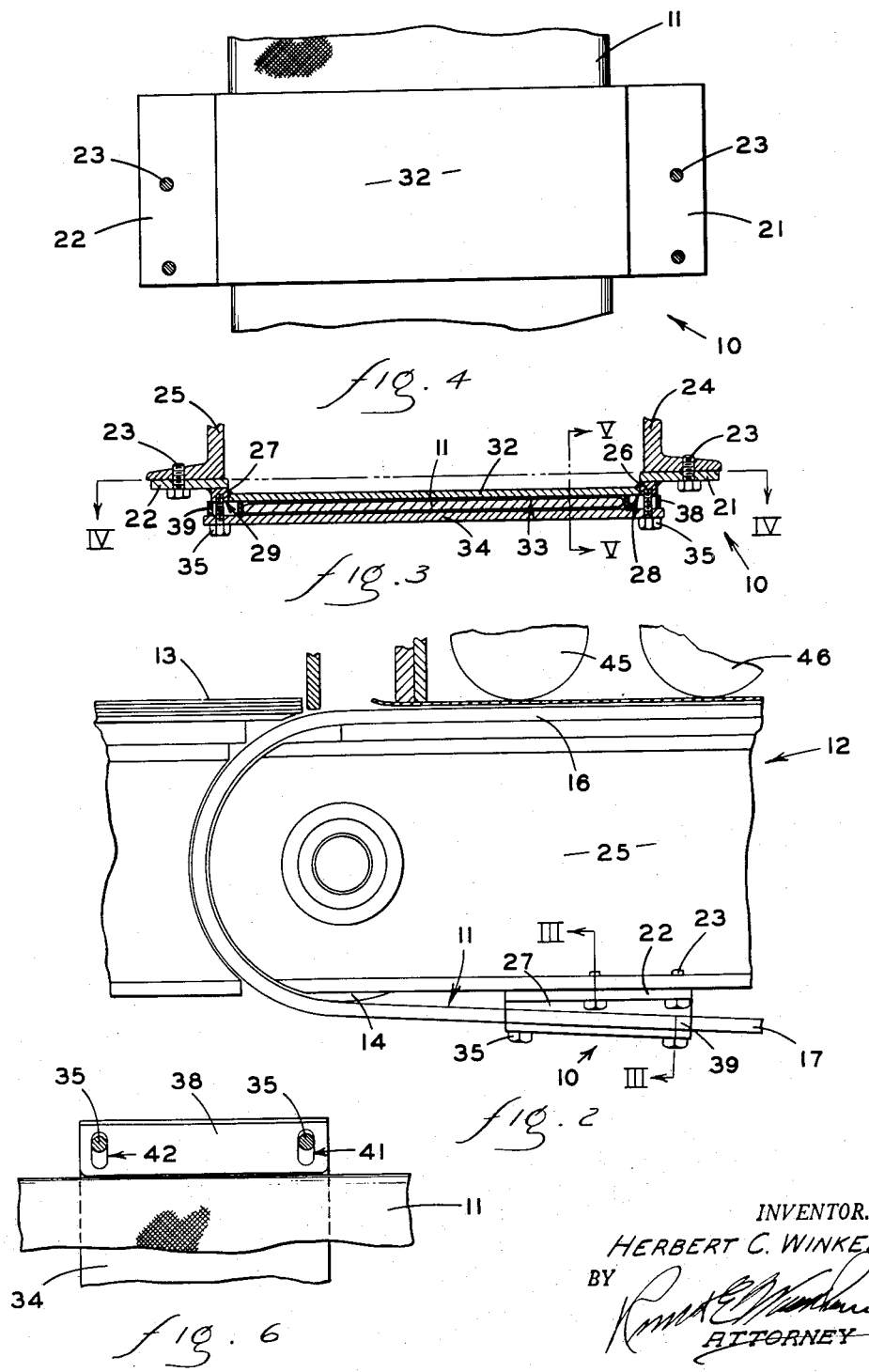
INVENTOR.
HERBERT C. WINKEL
BY
ATTORNEY United States Patent Office 2,750,805
Patented June 19, 1956

2,750,805

BELT ALIGNER

Herbert C. Winkel, Watervliet, Mich.

Application November 2, 1953, Serial No. 389,576

7 Claims. (Cl. 74—240)

This invention relates in general to a belt-aligning device and more particularly to a type thereof adapted for use with a belt of extreme flexibility.

In certain types of machines using flat, endless belts, usually made of canvas or other textile material, such as a machine used to apply paste to battery grids, the belt becomes wet during the normal operation of the machine. Much of the moisture is squeezed out of the belt after the paste-filled grids have been discharged from the conveyor belt, but enough remains to render the belt extremely flexible. As a result, it has been very difficult to keep such a belt properly aligned on its pulleys. Since the belt is being used to support and convey flat, rather fragile articles, it has not been feasible to use crowned pulleys to support the belt. Actually, experimental work done with crowned pulleys has indicated that even if it were practicable to use them, they would not be entirely satisfactory in keeping the water-soaked belt aligned.

Further, it has been observed that such water-soaked belts tend to vary in width and flexibility both with and without use. Also, the replacement belts are often found to vary appreciably in width from the width of the belt being replaced, both in its original shape and in its shape just prior to replacement. Any device for aligning such a belt must, therefore, be easily adjustable to compensate for such variations.

Thus, in order to hold the belt properly centered on the pulleys, it is necessary to provide some type of easily adjustable belt-aligning device which will properly correct the positioning of any reasonably applicable belt which is not accurately centered and which in so doing will not buckle or fold the belt, regardless of its transverse flexibility.

Accordingly, it is a principal object of this invention to provide a device for holding a transversely flexible belt properly centered as it travels around a pair of spaced, parallel pulleys or drums.

A further object of the invention is to provide a device, as aforesaid, which will not materially increase the power requirements for driving the machine.

A further object of the invention is to provide a device, as aforesaid, which will perform its function accurately without folding or otherwise destroying or distorting the normal required shape of the belt.

A further object of the invention is to provide a device, as aforesaid, which will function accurately with respect to a given belt in spite of the changing flexibility and width of said belt during the operation of the machine as well as during periods of inoperation.

A further object of the invention is to provide a device, as aforesaid, which is structurally simple, which can be economically manufactured, and which will require relatively little maintenance.

A further object of the invention is to provide a device, as aforesaid, which is particularly adaptable to a battery plate grid pasting machine for holding the belt thereof in proper operational position.

Other objects and purposes of the invention will be apparent to persons acquainted with apparatus of this general sort upon reading the following specification and inspecting the accompanying drawings.

In the drawings:

Figure 1 is a side view, partially broken away of a typical grid pasting machine with which the present invention is advantageously used.

Figure 2 is an enlarged view of a portion of the machine shown in Figure 1 including the belt-aligning device.

Figure 3 is a sectional view taken along the line III—III of Figure 2.

Figure 4 is a sectional view taken along the line IV—IV of Figure 3.

Figure 5 is a sectional view taken along the line V—V of Figure 3 with the belt omitted.

Figure 6 is a broken sectional view taken along the line VI—VI of Figure 5 with the belt added.

Figure 7 is an enlarged view of a portion of Figure 3 near the leftward end thereof.

In meeting the objects and purposes set forth above, as well as others related thereto, I have provided a device comprised of a pair of parallel guide plates held apart at their opposed ends by a pair of guide bars adjustably mounted upon one of said plates. This guide assembly is, in turn, mounted upon the frame of the machine with which it is used to embrace completely a portion of said belt, preferably just in advance of the point at which the alignment of said belt is most important.

As used herein, the terms "upper," "lower," and derivatives thereof will have reference to the machine and parts thereof in their normal manner of use. The terms "inner" and "outer" will refer to the geometric center of the machine or its parts. The terms "left," "right," and derivatives thereof will refer to the machine and its parts as appearing in Figures 3 and 4. The terms "front," "rear," and derivatives thereof will have reference to the rightward and leftward ends, respectively, of the machine as appearing in Figure 1.

*Construction*

For the purposes of convenience in illustration, my belt aligner 10 (Figures 1, 2, 3 and 4) is disclosed in conjunction with the flat, endless flexible belt 11 of a machine 12 for applying paste to a succession of battery grids. The belt aligner 10 has been found particularly useful in such a machine because, in the processing of the grids 13, the belt 11 must of necessity become saturated with moisture, thereby making it very flexible and as a result difficult to align with presently known devices. Nevertheless, accurate alignment is absolutely essential.

In the machine 12, the belt 11 extends around a pair of horizontally spaced pulleys or drums 14 and 15, whose axes are substantially parallel and horizontal, the pulley 15 being driven by the motor 43 in any convient manner and the pulley 14 being an idler. Thus, the belt 11 is provided with upper and lower courses 16 and 17, with the upper course 16 being the tight side and the lower course 17 being the slack side. The grid dispensing mechanism 18 is disposed adjacent to the trailing or rear end of the belt upper course 16, which course then passes under the paste hopper 19. Alignment of the belt 11 can take place effectively only where a little slack exists and hence the aligning device is positioned on the lower course 17 and it is placed as close to the idler pulley 14 as possible.

In this particular embodiment of my invention, the belt aligner 10 is comprised of a pair of spaced, paralle, elongated mounting elements 21 and 22 which are secured, as by the bolts 23, to the lower edges of the spaced, parallel frame elements 24 and 25 of the machine 12. Said frame elements 24 and 25 extend longitudinally of the belt 11 on opposite sides thereof and rotatably support the pulleys 14 and 15 in a conventional manner. In this particular instance, the mounting elements 21 and 22 are secured to said frame elements closely adjacent to the rear pulley 14 around which the belt passes just in advance of the dispensing mechanism 18 and hopper 19.

The mounting elements 21 and 22 are provided with downwardly extending flanges 26 and 27, along the inner opposed parallel edges thereof. Said flanges 26 and 27 are preferably, but not necessarily, spaced from each other a distance substantially greater than the normal width of the belt 11, used with the machine 12. The lower edges 28 and 29 of said flanges 26 and 27 preferably define a plane inclined upwardly (Figure 2) toward the plane defined by the upper surfaces of the mounting elements 21 and 22 in the direction of movement of the lower course 17, which is toward the rear of the machine 12 in this particular embodiment. Such inclination is necessitated by a combination of the normal droop in the lower course 17 and the tension pulley 31 which bears downwardly against said lower course 17 to keep the belt 11 snugly engaged with the pulleys 14 and 15. Accordingly, under circumstances where the lower course 17 is held in a substantially horizontal attitude, said plane defined by the lower edges 28 and 29 may be parallel with the plane defined by the upper surfaces of the frame elements 24 and 25. In fact, conditions may arise wherein said plane defined by the lower edges 28 and 29 will be inclined downwardly toward the rear end of the machine 12.

An upper guide plate 32 (Figure 3) is disposed between and secured, as by welding, to the flanges 26 and 27 so that the lower surface 33, thereof, is coincident with said plane defined by the lower edges 28 and 29.

A lower guide plate 34 (Figure 3) of substantially the same length and slightly wider, transversely of said belt, than the upper guide plate 32, is disposed below and substantially parallel with the upper guide plate 32, and is held in place by any convenient means, as by means of the plate bolts 35. The bolts 35 extend through appropriate openings 36 in said lower guide plate adjacent to the leftward and rightward edges thereof (Figure 7), and are threadedly receivable into tapped openings 37 in the lower edges 28 and 29 of the flanges 26 and 27, respectively. The lower course 17 of the belt 11 is disposed between the upper and lower plates.

A pair of substantially parallel, elongated guide bars 38 and 39 (Figures 3, 6 and 7) are provided between said plates 32 and 34 along the opposite edges thereof and substantially parallel thereto. Each of said guide bars is provided with a pair of parallel slots 41 and 42 adjacent to the opposite ends of said bars with their lengthwise extent transverse of the longitudinal extent of said bars. The plate bolts 35 extend through the slots 41 and 42 before threadedly engaging the openings 37 in said flanges 26 and 27. The bars 38 and 39 are approximately of the same thickness as the belt 11. Thus, said bars space the upper and lower plates 32 and 34, respectively, from each other throughout their opposing surfaces a distance substantially equal to the thickness of said belt 11. The slots 41 and 42 permit movement of the bars 38 and 39 toward and away from each other, respectively, to permit adjustment of the distance between their mutually opposing edges to fit closely the width of the belt, while requiring that the edges be substantially parallel to each other at all times. This nesting of the belt is important to assure its positive alignment. The forward edges of bars 38 and 39 and plates 32 and 34 are tapered or chamfered to eliminate sharp edges which might fray the belt while being forced through the opening defined by said bars and plates.

Other details of the grid pasting machine with which this invention is particularly useful, may be found in my co-pending application Serial No. 103,634, now Patent No. 2,669,376, dated February 16, 1954.

*Operation*

In this particular embodiment of the invention, the mounting elements 21 and 22, hence the upper guide plate 32 secured to said mounting elements, are attached to the frame elements 24 and 25, respectively, of the machine 12 by means of the mounting bolts 23. The lower surface of the upper plate 32 is disposed closely adjacent to the upper surface of the lower course 17 of the belt 11. The lower guide plate 34, with the guide bars 38 and 39 positioned thereon, is then brought up adjacent to the lower course 17. The plate bolts 35 are then extended through the bolt openings 36, the slots 41 and 42 and engaged with the tapped openings 37 in the flanges 26 and 27. Before tightening the plate bolts 35, the guide bars 38 and 39 are moved toward each other until their opposed edges are closely adjacent to the corresponding edges of the belt lower course 17. Sliding engagement between the edges of said belt and said guide bars is sufficient and adequate. The plate bolts 35 are then tightened in place and the belt aligner 10 is in condition for operation.

During the operation of the machine 12, the belt 11 may, and often does, vary in width due to the amount of moisture taken in or as a result of the tension imposed upon said belt by the tension pulley 31. In such case, the width of the belt aligner 10 may be varied by simply loosening the plate bolts 35 and adjusting the guide bars 38 and 39 toward or away from each other as the case may be. It will be observed that such adjustment is very simple and the results of such a belt aligner particularly in this type of application, have been found extremely satisfactory.

As in many similar circumstances, the use of a crowned pulley as the pulley 14 not only fails to align the belt 11 properly, but also tends to fracture or warp the very frail grids 13 as they pass between said rear pulley 14 and the idler roller 44. Due to the frailness of the grids 13, there must be a complete backing to said grids when they pass under the hopper 19 where the paste is applied thereto by the paste rollers 45 and 46. Thus, the belt upper course 16 must be in proper alignment as it departs from said rear pulley 14.

By placing the aligner on the slack side of the belt, maximum freedom is provided for easy entry of the belt into the aligning device. However, as soon as the belt has entered the device, it is stiffened thereby and is positively delivered to the pulley 14 in proper relationship therewith and without any curling or rolling of its edges. By placing the aligner as close as possible to the idler pulley 14, there is obtained both the greatest degree of free entry of the belt into the aligning slot together with the most positive control over the delivery of the belt to the pulley 14.

My belt aligner 10 has been found to serve the desired purposes where other types of belt aligners, presently known to exist, have been completely inadequate and unsatisfactory.

Although the above specification and accompanying drawings disclose a particular, preferred embodiment of my invention, it will be understood that modifications thereof within the scope of such disclosure are fully contemplated unless the appended claims specifically state to the contrary.

I claim:

1. A device for aligning a flat, endless belt of inconstant flexibility and width, with respect to at least one pulley supporting said belt upon a machine, the combination comprising: an upper guide plate secured to said machine transverse of a course of said belt moving toward said pulley, said plate being wider than, parallel with, and adjacent to the upper surface of a relatively small portion of said course which is near to said pulley; a lower guide plate parallel with and spaced from said upper plate and substantially equal in width and length thereto, and adjacent to the lower surface of said course; a pair of similar, substantially parallel guide bars disposed between the opposing, transverse ends of said plates and adjacent to the lateral edges of said course, said bars being adjustable toward and away from each other and of substantially the same thickness as said belt; and means removably securing said lower plate and said bars to said upper plate.

2. In a machine having a frame supporting a pair of spaced pulleys, whose parallel axes define a first plane, and a flat endless belt subject to changes in flexibility and width supported by said pulleys, a device for aligning said belt, comprising: a pair of elements supported upon said frame and having parallel, downwardly extending flanges along the opposing edges thereof, the distance between the remote faces of said flanges being substantially greater than the width of said belt and the lower edges of said flanges defining a second plane inclined to said first plane along the center-line of said belt; an upper guide plate secured along opposite edges between and upon said flanges, the lower surface of said plate being coincident with said inclined plane; a lower guide plate parallel with and spaced downwardly from said upper plate, opposite edges thereof being disposed below said flange lower edges; a pair of similar, substantially parallel guide bars disposed between said flanges and the opposing portions of said lower plate, said bars being of substantially the same thickness as said belt, and each said bar having a pair of spaced, parallel slots transverse thereof; and means extending through said slots and removably securing said lower plate to said flanges, said means permitting movement of said bars toward and away from each other.

3. In a battery grid pasting machine having a pair of spaced, horizontal and parallel pulleys mounted upon the frame thereof and a flat, endless belt of varying flexibility and width supported by said pulleys, said belt having a lower course inclined to the horizontal, a device for aligning said belt with respect to means dispensing grids thereon, comprising: a pair of parallel elements supported upon said machine in a horizontal plane and having parallel, downwardly extending flanges along the opposing edges thereof, said flanges being spaced from each other a distance greater than the width of said belt, and the lower edges of said flanges defining a plane inclined upwardly toward said horizontal plane in the direction of movement of said course and substantially parallel with the upper surface thereof; an upper guide plate secured along its edges between and upon said flanges, the lower surface of said plate being coincident with said inclined plane; a lower guide plate parallel with and spaced downwardly from said upper plate and substantially equal in width and length thereto, said lower plate engaging the lower surface of said course; a pair of similar substantially parallel guide bars disposed between said flanges and the opposing portions of said lower plate, adjacent to the lateral edges of said course, said bars being of substantially the same thickness as said belt, and each said bar having a pair of spaced, parallel slots transverse thereof; and means extending through said slots and removably securing said lower plate to said flanges, said means permitting adjustment of said bars toward and away from each other.

4. In a machine having a frame supporting a pair of spaced pulleys and a flat endless belt supported by said pulleys, a device for aligning said belt comprising: a pair of elements supported upon said frame and having downwardly extending flanges along the opposing edges thereof; an upper guide plate secured along opposite edges between and upon said flanges; a lower guide plate parallel with and spaced downwardly from said upper guide plate, opposite edges thereof being disposed below the lower edges of said flanges; a pair of similar, substantially parallel guide bars disposed between the opposing portions of said plates, said bars being of substantially the same thickness as the said belt, each said bar having a pair of spaced, parallel slots transverse thereof and means extending through said slots and removably securing said lower plate to said flanges, said means permitting movement of said bars toward and away from each other.

5. In a machine having a frame supporting a pair of spaced pulleys, one of said pulleys being driven and the other non-driven, and a flat endless belt encircling said pulleys, a device for aligning said belt, comprising: a pair of elements supported upon said frame and having downwardly extending flanges along the opposing edges thereof, the distance between the remote faces of said flanges being greater than the width of said belt, said flanges being located in close proximity to the non-driven pulley adjacent the slack side of said belt; an upper guide plate secured along opposite edges between and upon said flanges; a lower guide plate parallel with and spaced downwardly from said upper plate; a pair of similar substantially parallel guide bars disposed between opposing transverse ends of said plates, said bars being of substantially the same thickness as said belt, and means for adjusting said bars toward and away from each other.

6. A conveying device comprising: a pair of spaced, parallel pulleys, one being driven and the other non-driven; a flat, endless belt encircling said pulleys and having a lower reach movable toward said non-driven pulley, said belt being inconstant both in flexibility and width, said lower reach being substantially horizontal; alignment means engaging said lower reach in a zone which is closer to said non-driven pulley than to said driven pulley for centering said belt on said non-driven pulley, said alignment means comprising upper and lower spaced guide plates snugly embracing the horizontal surfaces of said reach, and a pair of spaced guide bars snugly embracing the lateral edges of said reach, said bars being laterally adjustably secured between the said guide plates.

7. A conveying device comprising: a pair of spaced parallel pulleys, one being driven and the other non-driven; a flat, endless belt encircling said pulleys and having a lower reach movable toward said non-driven pulley, said belt being inconstant both in flexibility and width, said lower reach being substantially horizontal; alignment means engaging said lower reach in a zone which is closer to said non-driven pulley than to said driven pulley for centering said belt on said non-driven pulley, said alignment means comprising upper and lower spaced guide plates snugly embracing the horizontal surfaces of said reach, and a pair of spaced guide bars snugly embracing the lateral edges of said reach, said bars being laterally adjustably secured adjacent the edges of said guide plates and positioned between planes defined by the mutually opposed surfaces of said guide plates.

References Cited in the file of this patent

UNITED STATES PATENTS

| | | |
|---|---|---|
| 622,526 | Nies et al. | Apr. 4, 1899 |
| 648,615 | Hamilton | May 1, 1900 |
| 732,074 | Hayes | June 30, 1903 |
| 1,513,012 | Schey | Oct. 28, 1924 |